US008659703B1

(12) United States Patent
Candelore

(10) Patent No.: US 8,659,703 B1
(45) Date of Patent: Feb. 25, 2014

(54) ADAPTING LAYOUT AND TEXT FONT SIZE FOR VIEWER DISTANCE FROM TV

(71) Applicant: Sony Corporation, Tokyo (JP)

(72) Inventor: Brant Candelore, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/658,272

(22) Filed: Oct. 23, 2012

(51) Int. Cl.
*H04N 9/74* (2006.01)
*H04N 5/44* (2011.01)
*H04N 5/66* (2006.01)
*G08C 17/00* (2006.01)

(52) U.S. Cl.
USPC ........... 348/581; 348/553; 348/734; 348/739; 340/686.6

(58) Field of Classification Search
USPC ......................... 348/553, 739, 734, 569, 581; 340/686.1, 686.6, 12.54, 12.55
See application file for complete search history.

(56) References Cited

U.S. PATENT DOCUMENTS 4,843,464 A * 6/1989 Choi ............................. 348/163
5,376,970 A * 12/1994 Amano ......................... 348/569
6,407,779 B1 * 6/2002 Herz ............................. 348/734
7,966,568 B2 * 6/2011 Kim .............................. 715/764
7,969,413 B2 6/2011 Aonuma et al.
8,085,293 B2 12/2011 Brodsky et al.
2004/0088727 A1 * 5/2004 Kamiya .......................... 725/52
2004/0123320 A1 6/2004 Daily et al.
2007/0293190 A1 * 12/2007 Ota ............................ 455/404.2
2008/0174551 A1 * 7/2008 Ishibashi ....................... 345/158
2008/0204476 A1 8/2008 Montague et al.
2008/0244650 A1 * 10/2008 Yamaguchi ..................... 725/39
2009/0079765 A1 * 3/2009 Hoover .......................... 345/660
2009/0106653 A1 * 4/2009 Lee et al. ....................... 715/273
2010/0045866 A1 * 2/2010 Angiolillo ..................... 348/554
2010/0136441 A1 * 6/2010 Mori et al. .................... 429/416
2010/0238041 A1 * 9/2010 Acedo et al. ............... 340/686.6
2010/0319014 A1 * 12/2010 Lockett et al. .................. 725/14
2011/0016492 A1 * 1/2011 Morita ............................ 725/58
2011/0211114 A1 * 9/2011 Cooper ......................... 348/441
2011/0267291 A1 11/2011 Choi et al.
2012/0092564 A1 * 4/2012 Bae .............................. 348/734
2012/0246678 A1 * 9/2012 Barksdale ....................... 725/37
2013/0027614 A1 * 1/2013 Bayer et al. ................... 348/563

* cited by examiner

*Primary Examiner* — Victor Kostak
(74) *Attorney, Agent, or Firm* — John L. Rogitz; John M. Rogitz

(57) ABSTRACT

The size of characters presented on a display of an audio video display device (AVDD) such as a TV is changed based on a distance from the AVDD at which a viewer is sensed as being located.

12 Claims, 3 Drawing Sheets

*FIG. 1* SYSTEM

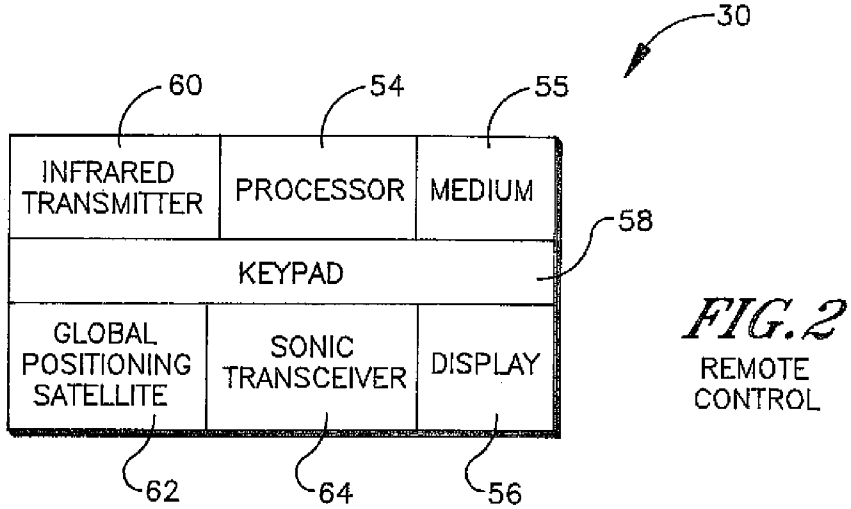
FIG. 2
REMOTE CONTROL
FIG. 3
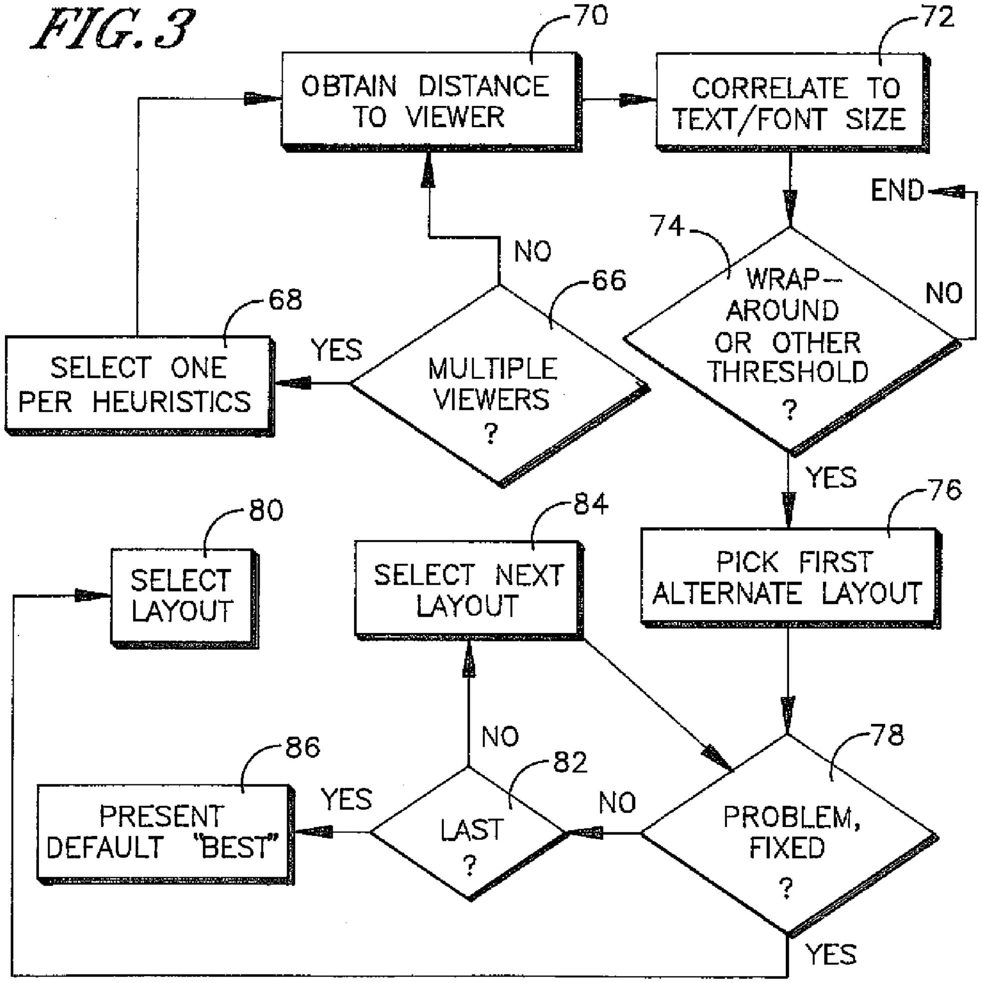

ADAPTING LAYOUT AND TEXT FONT SIZE FOR VIEWER DISTANCE FROM TV

FIELD OF THE INVENTION

The present application relates generally to adjusting the layout and text and font sizes of images presented on audio video display devices (AVDD) such as TVs based on a viewer's distance from the AVDD.

BACKGROUND OF THE INVENTION

Large screen audio video display devices (AVDD) such as TVs are increasingly used to fulfill roles formerly played by personal computers, foremost among them being to surf the Internet. Unlike users operating computers, however, whose distance from the computer screen is predictable to within a few inches thus facilitating use of standard onscreen font sizes and icon sizes, TV viewers usually are seated variable and thus unpredictable distances from the TV. As understood herein, the result is that Internet-sourced text on TV screens is often too small to read, creating a user unfriendly experience.

SUMMARY OF THE INVENTION

Multiple ways are disclosed to determine the distance that the viewer is away from a TV display, and based on that, to alter the font and icon size of characters presented on the display. In one embodiment the TV automatically adjusts the layout and font size to accommodate incoming web pages. The second approach is for software executed by the TV to communicate to the server the following information: the type of client, e.g., TV with 40" with HD resolution screen running in full screen mode, and proximity of the viewer to the screen. The intent of the second approach would be that the server would adapt the web page for the TV client.

In one aspect, the distance to the remote control (RC), which is typically located with the viewer, is used as a surrogate for viewer distance. In another aspect, a camera on the TV images the viewer and determines viewer distance from the TV. In either case, note that adjusting the size of text and icons can precipitate a change of the layout of web page or the arrangement of items on screen. Also, the viewing angle up or down and also to the side is subjective to how much of the "big screen" effect they want to have. Some viewers will be closer in order to be more immersed into the programming while others will be further back.

Accordingly, a device includes a processor configured to send demanded images to a display, and a computer readable storage medium accessible to the processor and bearing instructions executable by the processor to configure the processor to determine a distance between a viewer and the display. Responsive to the distance, the processor alters a size of text being presented on the display from a first size to a second size different from the first size.

If desired, the processor can determine the distance based on user input or based on a sensor signal, altering the size of text being presented on the display substantially in real time as making the determination of the distance. The processor may also be configured to alter a size of icons being presented on the display responsive to the distance. The sensor signal may be from, e.g., a position receiver, a camera, or a sonic transducer. With more particularity, responsive to the distance, the processor is configured to alter a first size of text being presented on the display at a first time at which the viewer is positioned a first distance from the device, to a second size at a second time at which the viewer is positioned a second distance from the device.

In another aspect, a method includes sensing a distance at which a viewer of an audio video display device (AVDD) is located, and changing a size of characters presented on a display of the AVDD based on the distance from the AVDD at which the viewer is sensed as being located.

In another aspect, a system includes a remote control (RC) including a touch screen, and an audio video display device (AVDD) receiving signals from the RC and responsive to swipes by a user on the touch screen, enlarging and reducing font sizes of characters presented on a display of the AVDD.

In another aspect a method includes sensing or receiving a distance at which a viewer of an audio video display device (AVDD) is located, and communicating the distance information to a web server. Screen resolution can also be communicated from the AVDD to the server. The distance information may be communicated as part of the User Agent field of the HTTP request message for a web page, or as part of a query string that is part of the URL requesting a web page.

The details of the present invention, both as to its structure and operation, can be best understood in reference to the accompanying drawings, in which like reference numerals refer to like parts, and in which:

BRIEF DESCRIPTION OF THE DRAWINGS

FIG. 2 is a block diagram of an example remote control (RC);

FIG. 3 is a flow chart of example logic according to present principles.

DETAILED DESCRIPTION OF THE PREFERRED EMBODIMENT

Figure 1:
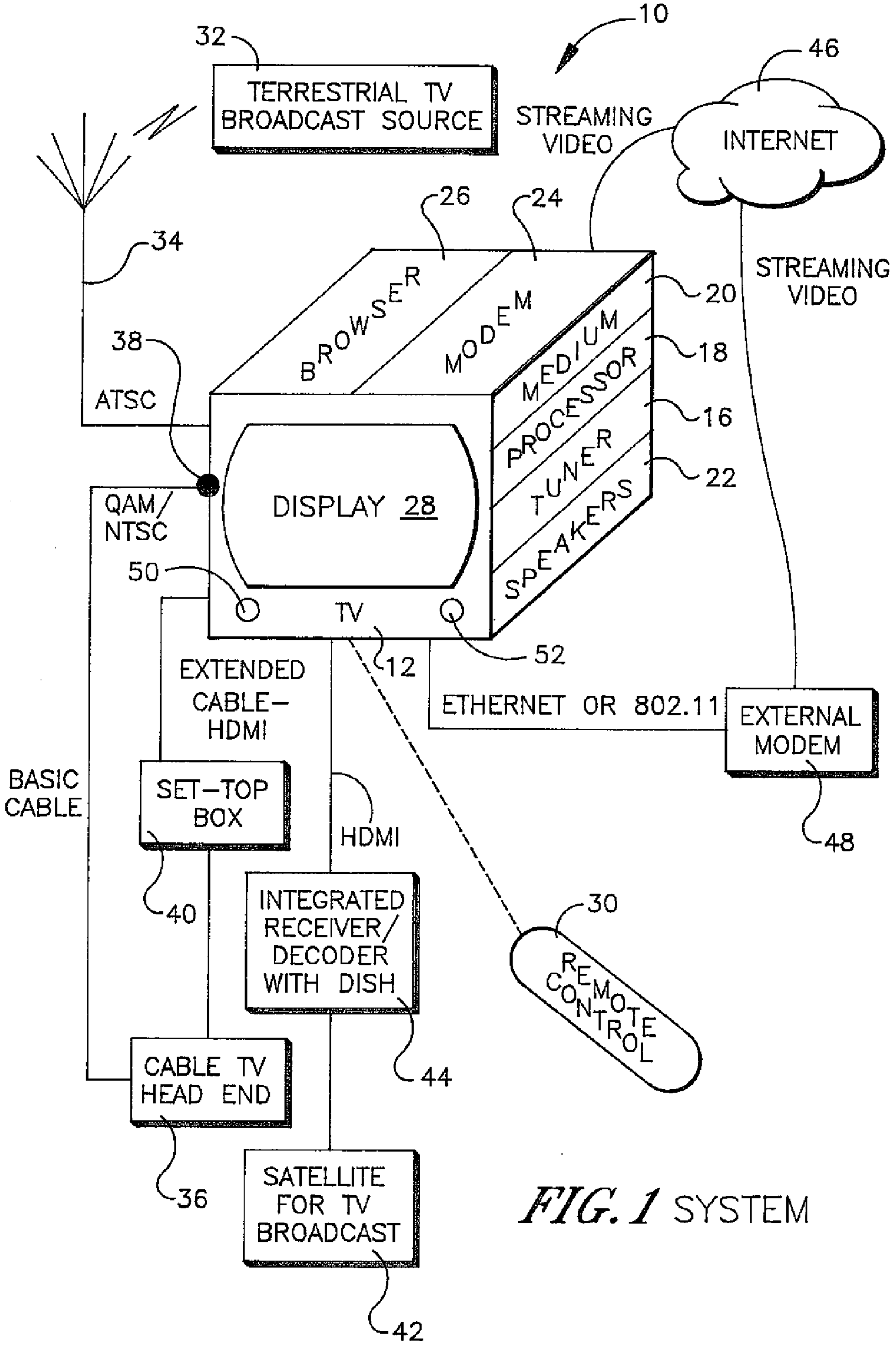
FIG. 1 is a block diagram of a non-limiting example system in accordance with present principles.

Referring initially to the non-limiting example embodiment shown in FIG. 1, a system 10 includes an audio video display device (AVDD) 12 such as a TV including a TV tuner 16 communicating with a TV processor 18 accessing a tangible computer readable storage medium 20 such as disk-based or solid state storage. The AVDD 12 can output audio on one or more speakers 22. The AVDD 12 can receive streaming video from the Internet using a built-in wired or wireless modem 24 communicating with the processor 12 which may execute a software-implemented browser 26. Video is presented under control of the TV processor 18 on a TV display 28 such as but not limited to a high definition TV (HDTV) flat panel display, and may be a touch screen display. The display 28 may be a 40" or larger display. User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the AVDD 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV. Other types of connections may be used, e.g., MOCA, USB, 1394 protocols, DLNA.

Similarly, HDMI baseband signals transmitted from a satellite source 42 of TV broadcast signals received by an integrated receiver/decoder (IRD) 44 associated with a home satellite dish may be input to the AVDD 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the AVDD 12 and conveyed to the AVDD 12 over a wired or wireless Ethernet link and received at an RJ45 or 802.11x antenna on the TV chassis.

Also, in some embodiments one or more cameras 50, which may be video cameras integrated in the chassis if desired or mounted separately and electrically connected thereto, may be connected to the processor 18 to provide to the processor 18 video images of viewers looking at the display 28. The one or more cameras 50 may be positioned on top of the chassis of the AVDD, behind the display and looking through display, or embedded in the display. Because the cameras 50 are intended to detect a person they may be infrared (IR) cameras embedded behind the display.

Use of two or more cameras 50 can make locating the position of a viewer by the processor 18 easier. The cameras 50 may be two dissimilar cameras, e.g., one conventional and one IR camera. Since the camera locations are known by the processor 18, by training the size of a viewer of default size (e.g., five feet ten inches tall) can be learned, hence distance can be easily determined. Yet again, if three cameras are used, no training would be required as XYZ can be resolved by triangulation. An alternative option to the use of cameras 50 is proximity technology to enable repositioning of the virtual control ICONs. The following patent documents, incorporated herein by reference, disclose such technology: USPPs 2008/0122798; 2010/0127970; 2010/0127989; 2010/0090948; 2010/0090982. Furthermore, a microphone 52 may be provided on the chassis or separate therefrom and can be electrically connected to the processor 16 to provide viewer-generated voice commands to the processor 16.

Now referring to FIG. 2, an example RC 30 is shown. The RC 30 may include a processor 54 accessing a computer readable storage medium 55 and controlling a display 56 such as a touch screen display. The processor may receive viewer input from a keypad 58 and send commands in response to the input to the AVDD 12 by means of a transmitter 60 such as but not limited to an infrared (IR) transmitter.

In the embodiment shown, the processor 54 may receive position information from a position receiver 62 such as a global positioning satellite (GPS) receiver that is authorized to receive highly accurate position information. Note that the AVDD 12 may also include a position receiver. In some embodiments, the RC 30 may include a distancing transceiver 64 such as a sonic transceiver.

In other embodiments, a manually entered distance is measured or estimated by the viewer during configuration. The distance is input to the TV. From then on the TV will adjust web pages and other parameters noted herein according to this inputted distance. The TV might display, on a UI 400 such as that shown in FIG. 4, a set distances that a customer can choose, e.g., 6 feet, 8 feet, 10 feet, 12 feet, 15 feet, 17 feet or greater, etc. The distance that is entered or chosen by the user can also be delivered to websites by the TV. The server at the remote website can adjust the content for proper rendering on the TV. The distance information can be delivered as part of Query String that is part of the web page being requested or as User Agent data that is part of the HTTP request transaction for the web page.

FIG. 3 illustrates present logic. Commencing at decision diamond 66, the AVDD processor 18 determines, using for instance image recognition techniques applied to images from the camera(s) 50, whether multiple human viewers are located in front of the display 28. This may be done by comparing the forms of images in the signals from the camera(s) 50 to prestored forms on the computer readable storage medium 20. Responsive to a determination that multiple viewers are present the logic moves to block 68 to select a viewer. Selection may be effected by any one or more of heuristic tests. For example, the largest viewer in the camera's field may be selected, or the smallest. Or, the center-most image in the camera's field of view may be selected. Yet again, the image closest to an image matching the pattern of the RC 30 may be selected on the assumption that he who controls the RC rules the day.

From block 68 or from decision diamond 66 when the test there is negative, the logic proceeds to block 70 to obtain the distance to the selected viewer. This may be done using multiple cameras 50 as described above, or by using the above-referenced proximity technology. Or, recognizing that a viewer typically is co-located with the RC 30, the RC 30 may send its position as obtained from the position receiver 62 to the AVDD 12, which then determines the difference between its own position and that of the RC 30. Yet again, the RC 30 may, when pointed at the AVDD 12 to send an IR command signal, for example, also be programmed to simultaneously emit a sonic pulse from the sonic transceiver 64, which may be arranged on the RC 30 such that its beam direction matches that of the IR transceiver 60. The reflected sound wave from the AVDD 12 is then detected by the RC processor 54 and the time difference between transmission and reception of the reflection used to determine the distance between the AVDD 12 and RC 30 by multiplying the time difference by a nominal speed of sound in air. The RC processor 54 then sends this distance to the AVDD 12 via, e.g., the IR transmitter 60, preferably automatically while the RC 30 is still pointed at the AVDD 12 which is possible since the sound wave round trip and subsequent distance calculation occur in near real time while the viewer is still pointing the RC at the AVDD.

Yet again, instead of directly measuring the distance to the RC, the AVDD 12 may determine, based on the size of its image received from the camera 50, how far it is by, e.g., accessing a data structure correlating image size to RC distance. This is feasible because the size of the RC generally is known a priori and hence its relative sizes based on a various distances are known and stored in the AVDD memory 20.

Figure 4:
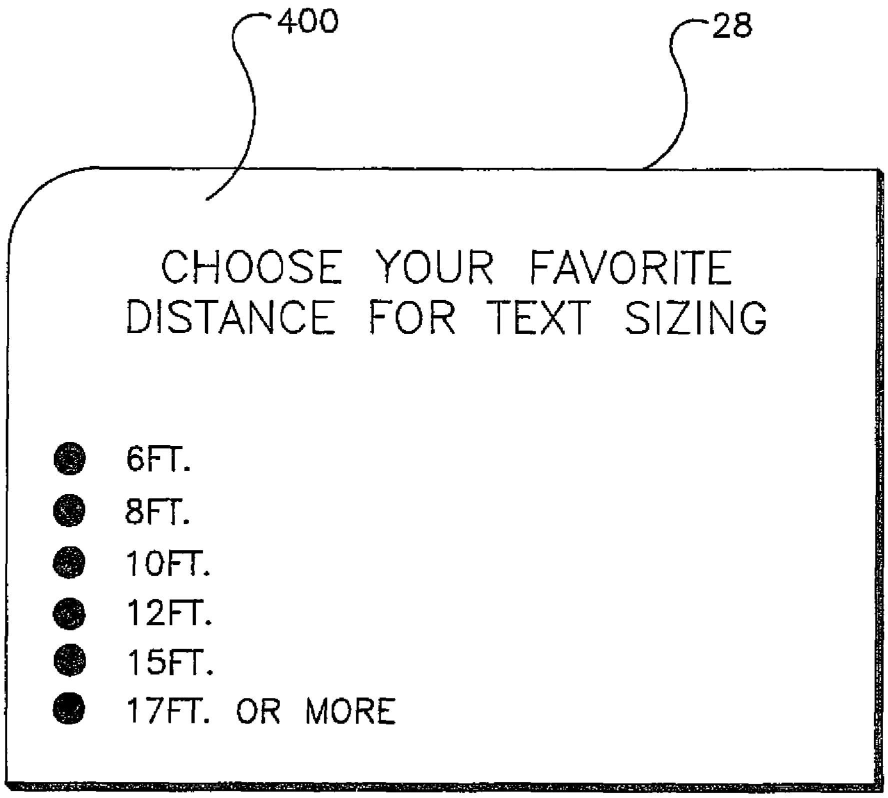
FIG. 4 is a screen shot of an example UI for entering distance.

As stated above, the AVDD may simply use the distance input by the user from the UI 400 of FIG. 4.

Once the viewer distance is known, the distance is correlated to a font and/or icon size at block 72. This may done by accessing a data structure correlating various viewer distances to font sizes. Or, a linear or other algorithm may be used to determine font sizes based on distance by, e.g., multiplying the distance by an empirically determined fraction.

Once the font size is determined, all fonts or some predetermined subset thereof, and/or all icons or some predetermined subset thereof, are given that size and then rendered when demanded on the AVDD display 28. Thus, the size of fonts (and icons if desired) on the AVDD display changes based on the distance at which the viewer is located from the AVDD. Note that the distance consequently can be based on a sensor signal (from the camera or sonic sensor or position receiver, etc.) and the alteration of the size of text is done substantially in real time as making the determination of the distance, i.e., within the computer processing time it takes to correlate the distance to font size once the distance is determined.

In some implementations, the logic may next flow to decision diamond 74 to determine if the new font size is large enough to require a wrap-around of text or other presentation artifact that may be undesired. If not, the logic ends, but if so, the logic may move to block 76 to select a first alternate layout for, e.g., the web page sought to be presented without the artifact caused by an enlarged font size. For example, if the default web page shows three columns of two rows each of selector elements, thumbnails, or other object, the first alternate layout may be two columns of three rows each. Or, the distance onscreen between adjacent objects may be reduced from the default distance to move the objects closer together and thereby permit more room for enlarged text. Or, the total number of objects may be reduced in the first alternate layout vis-à-vis the default layout and the remaining objects enlarged.

If the artifact is determined to be resolved by use of the first alternate layout at decision diamond 78, the layout is selected at block 80. Otherwise, it is determined if the alternate layout is the last available layout at decision diamond 82 and if not another layout is selected at block 84 for testing at decision diamond 78. If the last layout has been unsuccessfully tested, however, the logic presents a default "best" layout at block 86, which may be the original layout with the artifact.

In another embodiment, the touch screen 56 of the RC 30 may be swiped by a user to enlarge and reduce font sizes on the AVDD 12 and/or to control the AVDD 12. The user interface on the AVDD 12 may be sent to the RC 30 (via, e.g., IP connection, IR transmission, or other means) and as the UI on the RC is manipulated, the RC sends corresponding signals to the AVDD such that the UI on the AVDD is manipulated as well. Changes in resulting UI appearance may be shown only on the AVDD, not the RC 30. Note that the RC 30 may be established by a tablet computer or smart phone.

While the particular ADAPTING LAYOUT AND TEXT FONT SIZE FOR VIEWER DISTANCE FROM TV is herein shown and described in detail, it is to be understood that the subject matter which is encompassed by the present invention is limited only by the claims.

What is claimed is:

1. Method comprising:
imaging plural viewers of a video display using at least one camera;
responsive to a determination that plural viewers of the display are imaged, selecting a first one of the plural viewers using at least one selection test;
determining a distance from the display at which the first viewer of the display is located; and
based on the distance, presenting content optimized for observance on the display at the distance, wherein the selection test includes selecting a largest viewer in the camera's field of view.

2. The method of claim 1, wherein the method is executed by a processor in the AVD.

3. The method of claim 1, wherein the selection test includes selecting a center-most viewer of the plurality of viewers.

4. Method comprising:
imaging plural viewers of a video display using at least one camera;
responsive to a determination that plural viewers of the display are imaged, selecting a first one of the plural viewers using at least one selection test;
determining a distance from the display at which the first viewer of the display is located; and
based on the distance, presenting content optimized for observance on the display at the distance, wherein the selection test includes selecting a smallest viewer in the camera's field of view.

5. Method comprising:
imaging plural viewers of a video display using at least one camera;
responsive to a determination that plural viewers of the display are imaged, selecting a first one of the plural viewers using at least one selection test;
determining a distance from the display at which the first viewer of the display is located; and
based on the distance, presenting content optimized for observance on the display at the distance, wherein the selection test includes selecting a viewer whose image is closest to an image matching a pattern of a remote control device.

6. An audio video device (AVD), comprising:
at least one processor configured to send images to a display;
a computer readable storage medium accessible to the processor and bearing instructions executable by the processor to configure the processor to:
receive input pertaining to a distance at which an observer of the AVD is located from the display;
determine at least one content presentation characteristic that is optimized for observance on the display at the distance;
determine if the characteristic is large enough to result in a presentation artifact;
responsive to a determination that the characteristic is large enough to result in a presentation artifact, select at least a first alternate layout in which to present the content.

7. The AVD of claim 6, wherein the content includes a web page optimized for observance at the distance.

8. The AVD of claim 6, wherein the content includes audio video (AV) content, and the received content is configured for observance at least by optimizing at least of video of the AV content for observance on the display at the distance.

9. The AVD of claim 6, wherein a screen resolution associated with the display is communicated to a server along with the distance, the content being optimized at the server for observance based on both the distance and the screen resolution.

10. The AVD of claim 6, wherein the artifact is a wrap-around of text.

11. The AVD of claim 6, wherein the instructions when executed by the processor further configure the processor to:
determine whether the artifact is resolved by use of the first alternate layout;
responsive to a determination that the artifact is resolved by use of the first alternate layout, presenting content on the display using the first alternate layout; and
responsive to a determination that the artifact is not resolved by use of the first alternate layout, selecting a second alternate layout for test.

12. The AVD of claim 11, wherein the instructions when executed by the processor further configure the processor to:

responsive to a determination that a layout unsuccessfully tested is a last layout, presenting content on the display using a default layout.

* * * * *